May 14, 1940.

O. C. MARTIN 2,200,797

ELECTRORESPONSIVE LIGHT VALVE

Filed April 27, 1938

INVENTOR.
OTIS C. MARTIN
BY
ATTORNEY.

May 14, 1940.                O. C. MARTIN                2,200,797
                      ELECTRORESPONSIVE LIGHT VALVE
                       Filed April 27, 1938      2 Sheets-Sheet 2

INVENTOR.
OTIS C. MARTIN
BY Harold W. Mattingly
                ATTORNEY.

Patented May 14, 1940

2,200,797

UNITED STATES PATENT OFFICE 2,200,797

ELECTRORESPONSIVE LIGHT VALVE

Otis C. Martin, Los Angeles, Calif., assignor to Electrical Research Products, Inc., a corporation of Delaware Application April 27, 1938, Serial No. 204,702

9 Claims. (Cl. 88—61)

My invention relates to light valves and has particular reference to an electroresponsive valve of the type employing a plurality of metal ribbons disposed parallel to each other and responsive to variations in current flow therethrough to open or close the gap between adjacent ribbons.

For purposes of ready understanding of the principles of my invention, I will illustrate and describe the application of my invention to a light valve particularly adapted for recordation of sound for sound motion picture work though it will be understood by those skilled in the art that the principles of my invention may be employed equally as well in many other applications utilizing the motion between two parallel metal ribbons for the measurement of electrical current values.

In successful application of ribbon-type light valves for motion picture sound recording, it is essential for the successful operation thereof that (1) the ribbons employed may be readily tensioned to a natural frequency period higher than any sound frequency to which the ribbons must respond;

(2) adjacent ribbons must be so arranged that they may be initially adjusted toward and away from each other to provide the correct parallel spacing between them; and (3) the mounting of the ribbons must be such that the initial spacing and parallelism of the ribbons shall not be disturbed even after relatively long periods of use.

Heretofore in the construction, adjustment and operation of light valves of the metal ribbon type, it has been the practice to arrange spaced supporting members for each of the ribbons and to place the ribbons upon such supports by hand, the operator attempting to tension the ribbons and to arrange them in parallel relation prior to the clamping of the ribbons to the supports. Such method requires utmost skill and patience, it being necessary to hold the ribbons in place, tension them and then clamp them, after which the valve is inspected and tested to determine whether the tension and spacing is correct and if it is not the entire procedure must be repeated, usually many times before a properly adjusted valve is produced. As will be understood by those skilled in the art, the metal ribbons which are employed are extremely small size so that great care and skill must be exercised in handling them to prevent breakage and by the present methods of constructing the valves and threading the ribbons thereon it is quite common to consume several hours in the threading and adjusting of the ribbons.

It is therefore an object of my invention to provide a light valve assembly of the multiple ribbon type in which the ribbons are first securely clamped in place and then the clamping devices are adjusted to provide the desired tension and the desired spacing between the ribbons to facilitate the initial assembly and later servicing of the valves.

Another object of my invention is to provide a method of constructing and adjusting light valves of the metal ribbon type in which appropriate lengths of ribbons may be secured, each in its separate and individual pair of clamps, and then the clamps may be adjusted longitudinally or laterally with respect to the longitudinal axis of the ribbon to properly tension the ribbon and to adjust each ribbon toward and away from the adjacent ribbons to provide the desired parallel spacing therebetween.

Another object of my invention is to provide a light valve including a pair of clamping assemblies, each including a clamp for each ribbon to be employed in the valve and each provided with adjusting devices by which the ribbons associated with each of the clamps may be readily tensioned and may be readily adjusted laterally toward and away from the adjacent ribbons.

Another object of my invention is to provide a ribbon clamp for light valves in which the clamping mechanism defines a parallelogram permitting the lateral adjustment of the ribbon without twisting the ribbon about its longitudinal axis.

Other objects and advantages of my invention will be apparent from a study of the following specifications, read in connection with the accompanying drawings, wherein—

Figure 1:
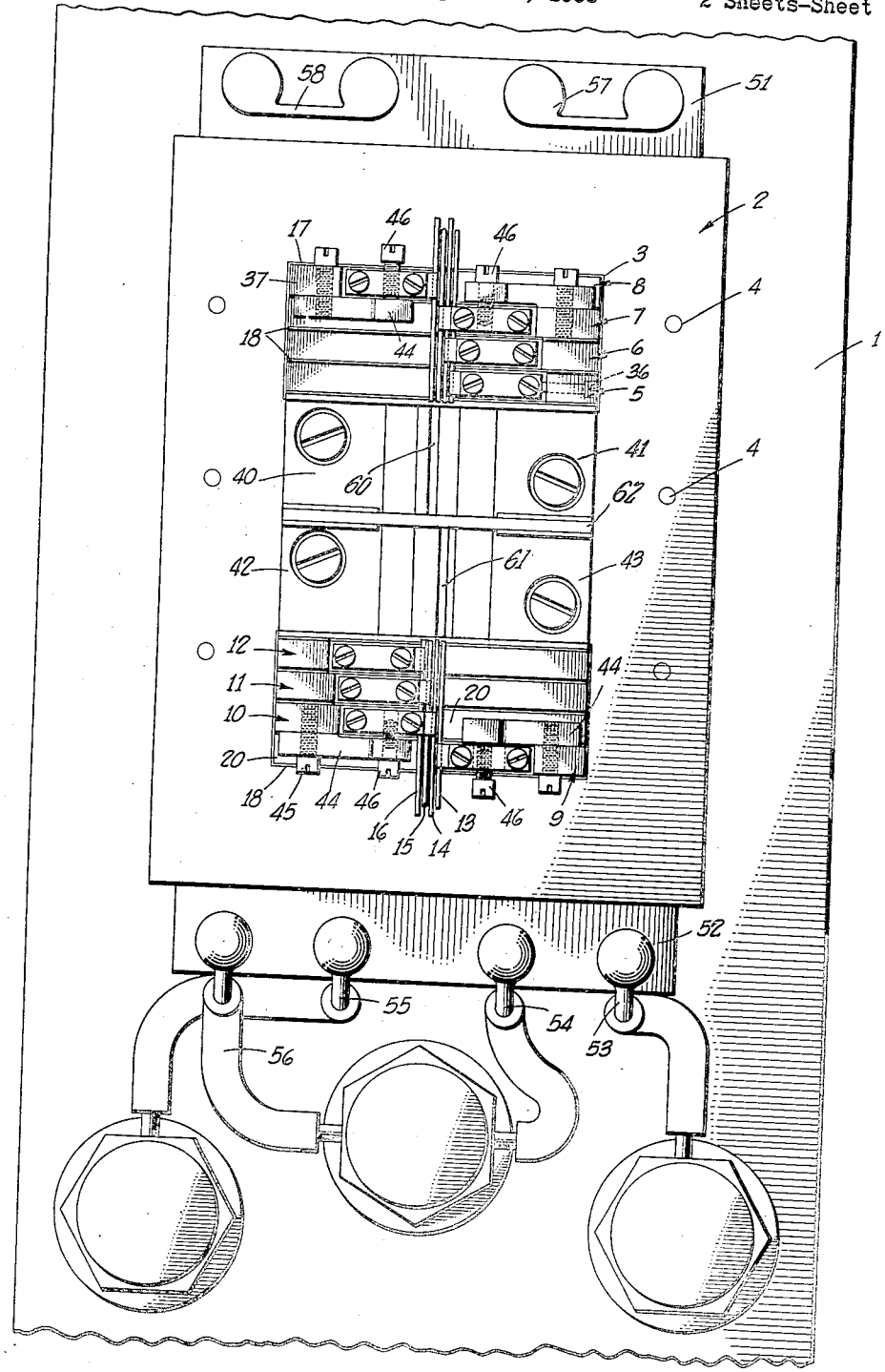
Fig. 1 is a top plan view of a light valve constructed in accordance with my invention.

Referring to the drawings, I have illustrated my light valve construction as particularly adapted to mount a plurality of metal ribbons in a 4-ribbon light valve construction though it will be understood by those skilled in this art that the principles of my invention are equally adaptable for use in a 2-ribbon valve or in a valve employing any other desired number of ribbons.

Figure 2:
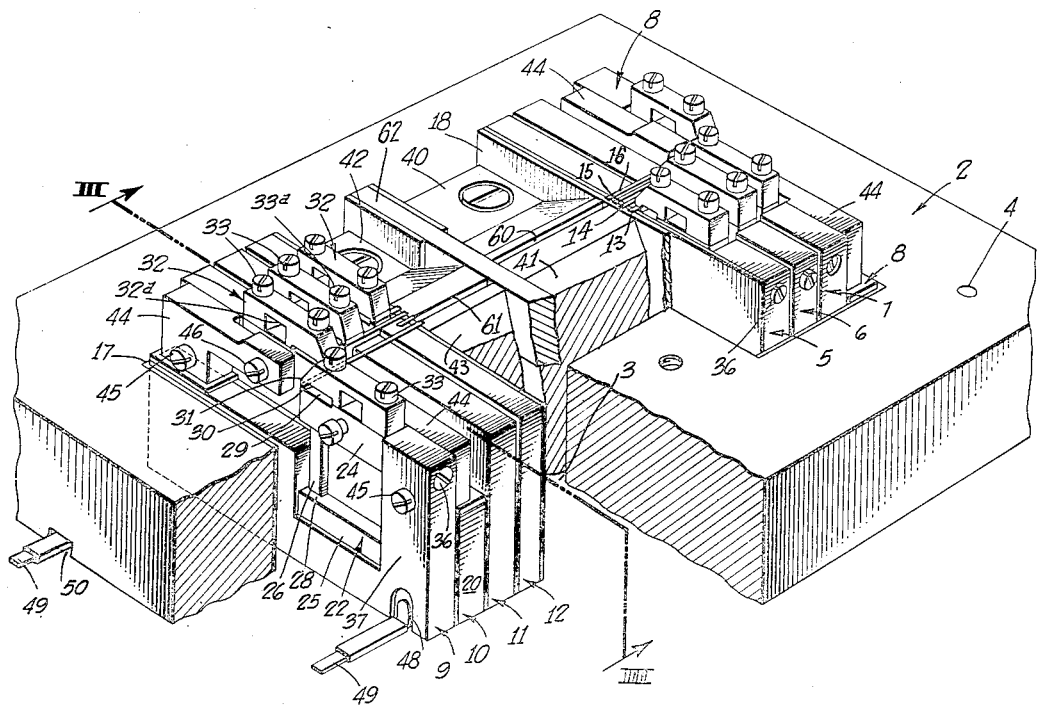
Fig. 2 is a perspective view of the assembled adjustable clamps for a 4-ribbon valve such as is shown in Fig. 1.

The assembly illustrated in Fig. 1 includes a mounting block 1 which may be constructed in any suitable manner to permit its ready assembly upon and removal from a sound recording camera, the mounting block 1 constituting a support to which is attached a valve base block 2 having a substantially H-shaped opening 3 formed therein, as is illustrated particularly in Fig. 2. The base block 2 may be secured to the mounting block 1 in any suitable manner as by means of screws 4.

The legs of the H-shaped opening 3 are disposed at either end of the base block 2 and constitute recesses into which may be secured a plurality of individual clamp assemblies 5, 6, 7 and 8 at one end of the block 2 and 9, 10, 11 and 12 at the opposite end of the base block 2, the clamp assemblies 5 and 9 constituting a pair of clamps for engaging opposite ends of one ribbon 13, assemblies 6 and 10 constituting a pair of clamps for engaging opposite ends of a second ribbon 14, while assemblies 7 and 11 secure opposite ends of a third ribbon 15, and assemblies 8 and 12 perform a similar service for a fourth ribbon 16.

The clamp assemblies 5, 6, 7 and 8 are each insulated from each other and from the base block 2 by any suitable insulating means such as mica and plastic 17 so that each of the clamping assemblies constitutes means for passing electric current to and through the individual ribbon supported thereby. Similarly, the clamp assemblies 9, 10, 11 and 12 are insulated from each other and from the base block 2 as indicated at 18, the insulation 17—18 being preferably employed not only to insulate the assemblies but also as a cement which secures the assemblies to the base block 2.

Figure 3:
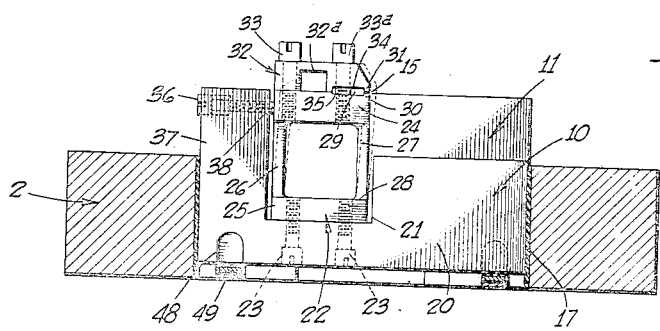
Fig. 3 is a sectional view through the assembly shown in Fig. 2 taken along line III—III of Fig. 2 and illustrating in detail the construction and assembly of one of the adjustable clamps employed in the practice of my invention.

The clamp assemblies 5—12 are substantially identical with each other and in Fig. 3 one of such clamp assemblies 11 is illustrated in detail and it will be observed that the assembly includes a clamp carriage body 20 having a relatively wide slot 21 extending from its upper edge to provide a recess into which a clamp carriage 22 may seat, the clamp carriage 22 being secured to the body 20 as by means of a pair of screws 23. The clamp carriage 22 comprises a parallelogram formed of steel or similar resilient material, the horizontal legs 24 and 25 of which are relatively wide while the vertical legs 26 and 27 are relatively narrow so that when the carriage 22 is in place upon the body 20 the upper leg 24 may be shifted laterally, as viewed in Fig. 3, without disturbing the parallel relation between the upper and lower legs 24 and 25. To assist in providing flexibility to the legs 26 and 27, the material from which the carriage 22 is constructed may be milled out as indicated at 28 to render the legs 26 and 27 thin as well as narrow.

The upper leg 24 of the carriage 22 is provided with an elongated recess 29 extending almost to one end of the leg 24 but leaving a shoulder 30 at the end of the leg to constitute one gripping element to engage the lower surface of the ribbon 15 to be engaged thereby, the other gripping element comprising a shoulder 31 formed upon the outer end of a clamp cap 32 arranged to be secured to the carriage leg 24 by means of a screw 33. A recess 32a is formed in the cap 32 to allow the gripping end thereof to be normally sprung upwardly away from the gripping shoulder 30 while a second screw 33a is employed to clamp the cap shoulder 31 toward shoulder 30 to grip a ribbon therebetween.

The clamp cap has a recess 34 formed in its lower face complementary to the recess 29 on the carriage leg 24 to provide, when assembled upon the carriage 22, an elongated slot 35 between the leg 24 and the clamp cap 32.

When one end of the ribbon 15 is clamped between the clamp carriage 22 and the clamp cap 32, that end of the ribbon may be shifted laterally relative to the clamp carriage body by means of a lateral adjustment screw 36 threaded into and through an upstanding leg 37 on the clamp carriage body to abut the upper leg 24 of the clamp carriage, as indicated at 38.

As hereinbefore stated, the clamp assemblies 5—12 are substantially identical with each other though it will be observed from an inspection of Fig. 1 that the clamp bodies for each of the assemblies, 5, 6 and 7 are each formed with their upstanding legs 37 of progressively increasing width to normally dispose the clamp carriages carried respectively thereby in lateral offset relation with respect to each other. Similarly, the clamp bodies for the assemblies 12, 11 and 10 mount their carriages in progressively offset relation in a direction opposed to the offset relation of the carriages of assemblies 5, 6 and 7. The end assemblies 8 and 9 are illustrated as having been turned end for end to dispose their carriages in still further lateral offset relation to the carriages of the assemblies 5—6—7 and 12—11—10. Thus by loosening the clamp cap screw 33a on each of these assemblies, a ribbon 13 may be readily threaded endwise through the slots 35 and placed across the clamp shoulders 30 of the clamp carriages associated with assemblies 5 and 9, respectively, and the clamp caps may be replaced upon these assemblies to grip and clamp opposite ends of the ribbon 13 securely to each of the assemblies 5 and 9. As will be observed in Fig. 1, a suitable length of ribbon 13 is employed sufficient to extend at each end beyond the outermost clamp assemblies 8 and 9 so that an operator may readily grasp the end of the ribbon 13 and handle the same during the time it is being clamped in its associated assemblies 5 and 9. The preferred method of fastening the ribbon 13 is to clamp one end of the ribbon 13 in one of the assemblies, say 9, and then by hand draw the ribbon 13 taut across the opposite assembly 5 and clamp the ribbon in the assembly 5 while holding it stretched.

At this point it should be noted that the end of the ribbon extending beyond the clamp assembly 5 will pass through the slots 35 of the clamp assemblies 6 and 7 without engaging them. Similarly, the ribbon 14 may have one of its ends clamped to the assembly 10 and the opposite end of the ribbon may be grasped and passed through the assembly 6 and clamped in place thereon while stretched taut, the end of this ribbon extending through the slot 35 formed in the assembly 7 without being clamped thereto.

The ribbon 15 may now be clamped to the assembly 11 and stretched taut to have its opposite end engaged and clamped by the assembly 7, the end of the ribbon 15 extending outwardly beyond the clamp 11, passing through the slot 35 formed in the clamp assembly 10. One end of the ribbon 16 may now be clamped, preferably in the clamp assembly 8, and passed through the slots 35 in the assemblies 10 and 11 and while held stretched this end of the ribbon may be clamped in the assembly 12.

As will be understood by those skilled in this art, each of the ribbons will be pulled taut by hand to exert a substantial tension upon each of the ribbons prior to its being clamped in place and when all of the ribbons have been assembled as hereinbefore described, the ends of the ribbons may be cut off at each of their respective clamps and the free ends of the ribbons may then be discarded.

As will be understood by those skilled in the art, the light openings to be controlled by the ribbons are defined by groups of pole pieces 40—41 and 42—43, the pole pieces 40—41 being suitably arranged to define a light opening 60 beneath the pair of adjacent ribbons 15—16 while the pole pieces 42—43 define a light opening 61 beneath the pair of adjacent ribbons 13—14.

A partition 62 extends between the two pole piece groups 40—41 and 42—43 to insure proper lateral separation of the off-set apertures 60 and 61.

With the ribbons disposed in their clamps as hereinbefore described, the ribbons will lie substantially parallel with each other and substantially parallel with the light orifice they are designed to control but in order to insure accurate parallelism of the ribbons with respect to each other and with respect to their light orifices, the lateral adjustment screws 36 may now be tightened or loosened until correct parallelism is achieved.

It now remains to tension the ribbons 13, 14, 15 and 16, to tune them to a natural frequency period in excess to the frequencies to which they will be subjected during the recordation of sound and to accomplish this result I provide a tensioning member for each of the ribbons 13—16.

One of the clamp assemblies associated with each of the ribbons is provided with a tensioning device, that associated with the ribbon 14 constituting a tension arm 44 having a shape illustrated particularly in Figs. 1 and 2, one end of which is rigidly secured as by screw 45 to the upstanding leg 37 of the clamp carriage body for the assembly 10 while the opposite end of the tension arm extends along the side of the upper leg 24 of the clamp carriage 22 associated with the assembly 10. Thus a tension screw 46 passing through the free end of the tension arm 44 and threaded into the clamp carriage may be tightened in small increments to draw the upper leg 24 of this carriage away from the clamp assembly 6 which holds the opposite end of the ribbon 14. The tuning or tensioning operation should be performed while current of a predetermined frequency flows through the ribbon 14, the frequency selected being a frequency higher than the sound frequency to which the ribbon will be called upon to respond, and the ribbon 14 is observed to determine when it is tensioned to resonance with this predetermined frequency.

The ribbon 13 is similarly tensioned by providing a tension arm 44 upon the clamp assembly 9. In this instance the adjusting screw 46 is threaded through the upper leg 24 of the clamp carriage associated with the assembly 9 to abut the tension arm 44 and pull the clamp carriage away from the assembly 5 which holds the opposite end of the ribbon 13. A tension arm 44, corresponding in all respects to the arm 44 associated with the assembly 10, is provided upon the clamp assembly 7 and by tightening the tension screw 46 associated therewith, the clamp carriage for the assembly 7 is drawn away from the clamp carriage of the assembly 11 which holds the opposite end of the ribbon 15. Similarly, the tension arm 44 is provided upon the assembly 8, this arm corresponding in all respects to the tension arm 44 associated with the assembly 9 so that by tightening the tension screw 46 on the assembly 8, the ribbon 16 may be tuned to the desired frequency.

It will therefore be observed that employing my ribbon valve construction, in which each of the ribbons has its opposite ends clamped in an individual clamp assembly and which includes a clamp carriage laterally adjustable to secure the proper parallelism and proper spacing of the ribbon and providing upon at least one of the clamp assemblies for each ribbon an adjusting device which will draw one of the clamp carriages associated with each ribbon away from the clamp carriage securing the opposite end of this ribbon, suitable adjustment for tension may be made. It will be noted also that threading of the several ribbons may be readily accomplished without interference with the remaining ribbons so that each ribbon may be placed in the valve and separately and independently adjusted, both as to its proper positioning and proper tensioning, without interference with the remaining ribbons.

By using the individual clamping assemblies, current may be readily supplied to each of the ribbons as by providing a suitable electrical connection for each of the clamp carriage bodies illustrated particularly in Figs. 2 and 3 as including a shallow recess 48 formed in one face of each of the bodies to which a conductor 49 may be soldered, the conductor extending through suitable slots 50 in the ends of the base 2 to terminal blocks 51 and 52 at opposite ends of the base 2, at which blocks suitable connections 53, 54, 55 and 56 may be made to supply current in the desired direction to each of the ribbons 13—16, while at the opposite terminal block interconnection between the ribbons may be made by means of suitable shunts or jumpers 57 and 58.

While I have shown and described the preferred embodiment of my invention, I do not desire to be limited to any of the details of construction shown or described herein, except as defined in the appended claims.

I claim:

1. In a light valve having a light aperture, means for supporting a plurality of ribbons above said aperture including a pair of clamp assemblies disposed at opposite ends of the aperture for each of said ribbons, said assemblies each including a body extending laterally with respect to the aperture, a clamp carriage carried by the body and having clamping means associated therewith for engaging and gripping the end of a ribbon, means on each of said bodies for engaging and shifting the ribbon clamping end of said carriage laterally with respect to said aperture to adjust the lateral position of the associated ribbon relative to the aperture and relative to an adjacent ribbon, and tension means for each of said ribbons including means associated with at least one of the assemblies for each of the ribbons for engaging and shifting the ribbon clamping end of the carriage thereof longitudinally with respect to the axis of the ribbons.

2. In a light valve having a light aperture, means for supporting a plurality of ribbons above said aperture including a pair of clamp assemblies disposed at opposite ends of the aperture for each of said ribbons, said assemblies each including a body disposed laterally with respect to said aperture, a clamp carriage comprising a parallelogram having clamping means associated with one of the legs of the parallelogram for engaging and gripping the end of a ribbon, and means on the body engaging said leg of said parallelogram for shifting said leg laterally with respect to the aperture to adjust the position of the associated ribbon laterally with repect to the aperture and with respect to an adjacent ribbon.

3. In a light valve having a light aperture, means for supporting a plurality of ribbons above said aperture including a pair of clamp assemblies disposed at opposite ends of the aperture for each of said ribbons, said assemblies each including a body disposed laterally with respect to said aperture, a clamp carriage comprising a parallelogram having clamping means associated with one of the legs of the parallelogram for engaging and gripping the end of a ribbon, means on the body engaging said leg of said parallelogram for shifting said leg laterally with respect to the aperture to adjust the position of the associated ribbon laterally with respect to the aperture and with respect to an adjacent ribbon, tension means for tensioning the ribbons including a tension arm secured to the body and extending along said leg of said parallelogram, and means intercoupling said tension arm and said leg of said parallelogram to shift said leg longitudinally with respect to the axis of the ribbon secured thereby.

4. In a light valve having a light aperture, means for supporting a plurality of ribbons above said aperture including a pair of clamp assemblies disposed at opposite ends of the aperture for each of said ribbons, said assemblies each including a body disposed laterally with respect to said aperture, a clamp carriage comprising a parallelogram having clamping means associated with one of the legs of the parallelogram for engaging and gripping the end of a ribbon, and a screw on the body engageable with said leg of said parallelogram for shifting said leg laterally with respect to the aperture and for holding the leg in the shifted position to adjust the ribbon laterally both with respect to the aperture and with respect to an adjacent ribbon.

5. In a light valve having a light aperture, means for supporting a plurality of ribbons above said aperture including a pair of clamp assemblies disposed at opposite ends of the aperture for each of said ribbons, said assemblies each including a body disposed laterally with respect to said aperture, a clamp carriage comprising a parallelogram having clamping means associated with one of the legs of the parallelogram for engaging and gripping the ends of a ribbon, a screw on the body engageable with said leg of said parallelogram for shifting said leg laterally with respect to the aperture and for holding the leg in the shifted position to adjust the ribbon laterally both with respect to the aperture and with respect to an adjacent ribbon, tension means for tensioning the ribbons including a tension arm secured to the body and extending along said leg of said parallelogram, and screw means intercoupling said arm and said leg of said parallelogram for shifting said leg longitudinally with respect to the axis of the ribbon in minute increments to tune the ribbon to a predetermined natural frequency period.

6. In a light valve having a light aperture, means for supporting a plurality of ribbons above said aperture including a pair of clamp assemblies disposed at opposite ends of the aperture for each of said ribbons, said assemblies each including a body disposed laterally with respect to said aperture, a clamp carriage comprising a parallelogram having clamping means associated with one of the legs of the parallelogram for engaging and gripping the end of a ribbon, means attaching the opposite leg of said parallelogram to the body, and means on the body engaging said leg of said parallelogram for shifting said leg laterally with respect to the aperture to adjust the position of the associated ribbon laterally with respect to the aperture and with respect to an adjacent ribbon.

7. In a light valve, means for supporting and adjusting a plurality of parallel ribbons, both as to lateral spacing and as to tension, comprising a pair of clamp assemblies associated with each ribbon to engage and clamp opposite ends of the ribbon, each of said assemblies including a clamp carriage having gripping jaws disposed adjacent one edge thereof and having a recess of greater width than the thickness of said ribbons disposed immediately adjacent said jaws whereby each of said ribbons may be inserted into said clamping means by passing the ribbon endwise through said recess and into position between said jaws, a body for supporting said carriage, and means for shifting said carriage along said body to adjust the ribbon clamp for each ribbon relative to the clamps for the remaining ribbons.

8. In a light valve, means for supporting and adjusting a plurality of parallel ribbons, both as to lateral spacing and as to tension, comprising a pair of clamp assemblies associated with each ribbon to engage and clamp opposite ends of the ribbon, each of said assemblies including a clamp carriage having means for gripping and clamping the associated ribbon, a body for supporting said carriage, means for shifting said carriage along said body to adjust the ribbon clamp for each ribbon relative to the clamps for the remaining ribbons, means for electrically insulating each of said clamp assemblies from each other, and means for coupling electric conductors to each of said clamp assemblies for supplying current to said ribbons through said assemblies.

9. In a clamp assembly for engaging and clamping one end of a light valve ribbon, a base having a slightly flexible clamp carriage mounted thereon, means associated with the free end of said clamp carriage for engaging and clamping a ribbon, a plurality of means adjustably mounted in said base for engaging and shifting the ribbon engaging extremity of said clamp carriage in a plurality of directions relative to said base.

OTIS C. MARTIN.